US008829852B2

(12) United States Patent
Baek

(10) Patent No.: US 8,829,852 B2
(45) Date of Patent: Sep. 9, 2014

(54) METHOD AND DEVICE FOR CHARGING BATTERY

(75) Inventor: Seongmun Baek, Anyang-si (KR)

(73) Assignee: LG Chem, Ltd., Seoul (KR)

( * ) Notice: Subject to any disclaimer, the term of this patent is extended or adjusted under 35 U.S.C. 154(b) by 229 days.

(21) Appl. No.: 13/326,049

(22) Filed: Dec. 14, 2011

(65) Prior Publication Data

US 2012/0274275 A1 Nov. 1, 2012

Related U.S. Application Data

(63) Continuation of application No. PCT/KR2011/008265, filed on Nov. 2, 2011.

(30) Foreign Application Priority Data

Apr. 28, 2011 (KR) .................. 10-2011-0040340

(51) Int. Cl.
*H02J 7/00* (2006.01)
*G07F 19/00* (2006.01)
*G06Q 30/04* (2012.01)

(52) U.S. Cl.
CPC ............... *H02J 7/00* (2013.01); *Y02T 10/7088* (2013.01); *G06Q 30/04* (2013.01); *Y04S 30/12* (2013.01); *Y02T 90/169* (2013.01); *Y02T 90/168* (2013.01); *Y04S 30/14* (2013.01); *Y02T 10/7005* (2013.01)
USPC .............. 320/109; 320/104; 320/106; 705/34

(58) Field of Classification Search
USPC ............................. 320/106, 109, 104; 705/34
See application file for complete search history.

(56) References Cited

U.S. PATENT DOCUMENTS

| 5,422,624 | A | * | 6/1995 | Smith | 340/438 |
|---|---|---|---|---|---|
| 8,509,976 | B2 | * | 8/2013 | Kempton | 701/22 |
| 2010/0049639 | A1 | * | 2/2010 | Ferro et al. | 705/34 |
| 2010/0065627 | A1 | * | 3/2010 | Outwater | 235/381 |
| 2010/0207588 | A1 | * | 8/2010 | Lowenthal et al. | 320/165 |
| 2010/0211340 | A1 | * | 8/2010 | Lowenthal et al. | 702/63 |
| 2010/0289652 | A1 | * | 11/2010 | Javey et al. | 340/605 |
| 2011/0099111 | A1 | * | 4/2011 | Levy et al. | 705/63 |

FOREIGN PATENT DOCUMENTS

| JP | 2009-129384 A | 6/2009 |
|---|---|---|
| KR | 10-2009-0125560 A | 12/2009 |
| KR | 10-1014539 B1 | 2/2011 |

OTHER PUBLICATIONS

KIPO Notice of Preliminary Rejection for Appl. No. 10-2011-0040340 dated Nov. 27, 2012.

* cited by examiner

*Primary Examiner* — M'Baye Diao
(74) *Attorney, Agent, or Firm* — Birch, Stewart, Kolasch & Birch, LLP

(57) ABSTRACT

A method and device for charging a battery is provided. A charging device transmits a charging initiation request including the meter identifier and a charging identifier to a server, and receives a charging initiation response in response to the charging initiation request from the server. The charging device transmits a charging completion message indicating power consumed for the charging to the server upon completion of the charging, and receives charging information indicating billing information according to the charging of the battery from the server.

5 Claims, 5 Drawing Sheets

METHOD AND DEVICE FOR CHARGING BATTERY

TECHNICAL FIELD

This application claims the benefit of priority of Korean Patent Application No. 10-2011-0040340 filed on Apr. 28, 2011, all of which is incorporated by reference in its entirety herein.

The present invention relates to battery charging, and more specifically to a battery charging device and method for electric vehicles.

BACKGROUND

Electric vehicles have been developed that use electric energy as their operation sources in order to solve problems such as an increase in expense of fossil fuel and to promote resources recycling. Such electric vehicles wholly or partially adopt electrical power for operation.

An electric vehicle includes an electric storage mechanism, such as a battery. The electric storage mechanism needs to be electrically charged for continuous operation.

A charging station serves as a charging point for electric vehicles. The charging station may be located in a designated charging point similarly to a gas station. Or, the charging station may be considered to be positioned in a public or private parking lot.

Korean Patent No. 10-1014539 titled "charging device and method for a plug-in hybrid electric vehicle" discloses a method of permitting charging an electric vehicle and performing billing for charging.

Korean Patent Application Publication No. 10-2009-0125560 titled "intelligent electricity charging control cabinet and system for charging an electric vehicle" discloses a charging control cabinet that can independently perform a billing process.

Conventionally a charging station provided at a predetermined location may perform all of the processes including authentication, charging, and billing. However, such a charging station calls for a new authentication system and billing system for electric vehicles.

Electric vehicles exhibit a relatively short travelling distance compared to existing vehicles even when fully charged. Although charging stations may be installed at a shorter interval than an interval at which existing gas stations are installed, this is inefficient in light of expense and use of lands.

DETAILED DESCRIPTION

Problems To Be Solved By Invention

The present invention provides a method and device for charging a battery using communication with a server.

Technical Solution

In an aspect, a method for charging a battery is provided. The method includes obtaining a meter identifier for identifying an electricity meter that measures power consumed in a charging station provided with power, transmitting a charging initiation request including the meter identifier and a charging identifier for identifying a user to a server, receiving a charging initiation response in response to the charging initiation request from the server, after receiving the charging initiation response, connecting the charging station with the battery to perform charging, upon completion of the charging, transmitting a charging completion message indicating power consumed for the charging to the server, the charging completion message including the charging identifier and the meter identifier, and receiving charging information indicating billing information according to the charging of the battery from the server.

The step of obtaining the meter identifier may include transmitting an information request requesting the meter identifier to the electricity meter, and receiving an information response including the meter identifier in response to the information request from the electricity meter.

The method may further include performing user authentication, wherein when the authentication is successfully complete, the charging initiation request is transmitted.

In another aspect, a charging device for charging a battery includes a first connector electrically connected to the battery, a second connector electrically connected to a charging station to which electric power is supplied, and a control device connected to the first and second connectors, and configured to communicate with a server using a charging identifier for identifying a user and a meter identifier for identifying the electricity meter for measuring electric power consumed by the charging station and receive billing information according to the charging of the battery from the server.

In still another aspect, a server includes a billing DB for storing billing information for consumed power, a transceiver for communicating with an electricity meter that measures power consumed in a charging station provided with power and a charging device for charging a battery, and a billing for calculating unit connected to the transceiver and the billing DB, wherein the billing calculating unit is configured to receive a charging initiation request including a meter identifier for identifying the electricity meter and a charging identifier for identifying a user from the charging device, transmit a charging initiation response to the charging device in response to the charging initiation request, upon completion of the battery charging, receive a charging completion message indicating power consumed for the charging from the charging device, and transmit charging information indicating billing information according to the battery charging to the charging device.

Advantageous Effects

Without the need for a separate billing device or authentication device, a house or gas station in which an electricity meter is installed may be utilized as a charging station.

Since a plurality of points which a user may easily access may be utilized as charging stations, any inconveniences due to battery charging may be reduced thus increasing availability of the electric vehicles.

EMBODIMENTS

Electric vehicles refer to automobiles having one or more electric motors to obtain a driving force. Energy used for operating an electric vehicle may come from an electrical source, such as a battery and/or fuel cell that may be rechargeable. Electric vehicles include hybrid electric vehicles using a combustion engine as another driving power source.

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE).

A mobile communication network can be implemented using radio technology, such as Institute of Electrical and Electronics Engineers (IEEE) 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

Figure 1:
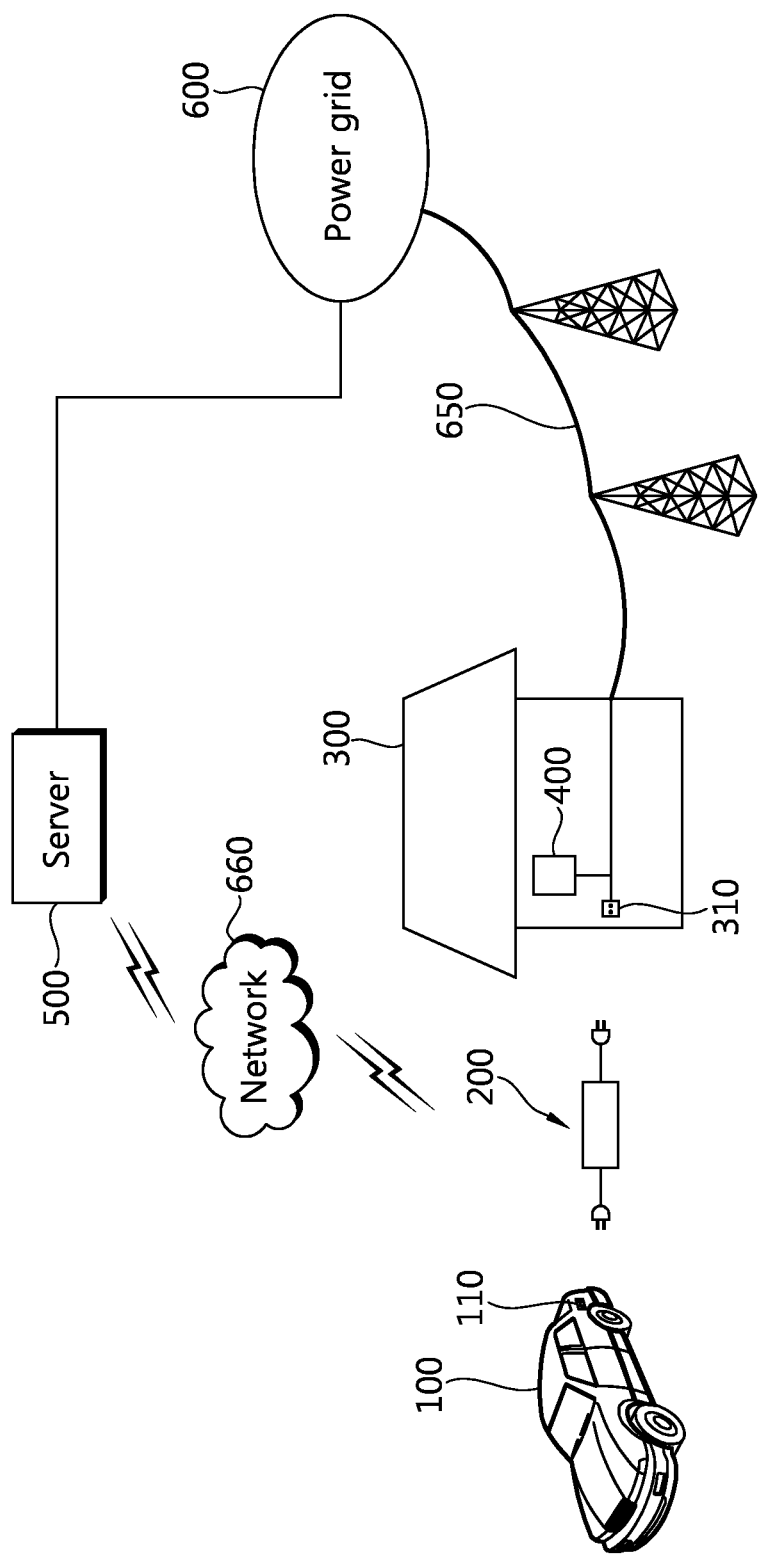
FIG. 1 is a view schematically illustrating a charging system according to an embodiment of the present invention.

FIG. 1 is a view schematically illustrating a charging system according to an embodiment of the present invention.

The charging system includes a vehicle 100, a charging device 200, a charging station 300, a server 500, and a power grid 600.

The charging station 300 is connected to the power grid 600 through a power line 650 and receives power from the power grid 600.

The power grid 600 includes one or more power generating facilities that generate electric power. The power grid 600 may include various power generating facilities, such as a thermoelectric power plant, a nuclear power plant, or a solar power plant.

The server 500 generates billing information according to use of electric power.

The charging station 300 is a place, such as a residential house, which supplies electric power. The charging station 300 includes an electricity meter 400 that measures electric power consumed by facilities of the charging station 300 and communicates with the server 500.

The electricity meter 400 may communicate with the server 500 through power line communication. Or, the electricity meter 400 may communicate with the server 500 through a mobile communication network 660.

The vehicle 100 includes an electrical charging device (not shown), such as a battery, and a connector 110.

The charging device 200 allows a user to electrically connect the vehicle 100 with the charging station 300 to recharge the battery. The charging device 200 is connected to the connector 110 of the vehicle 100 and is also connected to a connector 310 of the charging station 300.

The charging device 200 may communicate with the server 500 through the mobile communication network 660. Or, the charging device 200 may communicate with the electricity meter 400 through the mobile communication network 660 or a local access network.

The server 500 permits use of power and generates billing information according to the use of power.

First, the charging device 200 communicates with the server 500 to initiate recharge. In response to the server 500, the charging device 200 performs charging of the battery. Upon completion of the charging, the charging device 200 requests that the server 500 send billing information to the charging device 200. The server 500 sends the billing information to the charging device 200.

Figure 2:
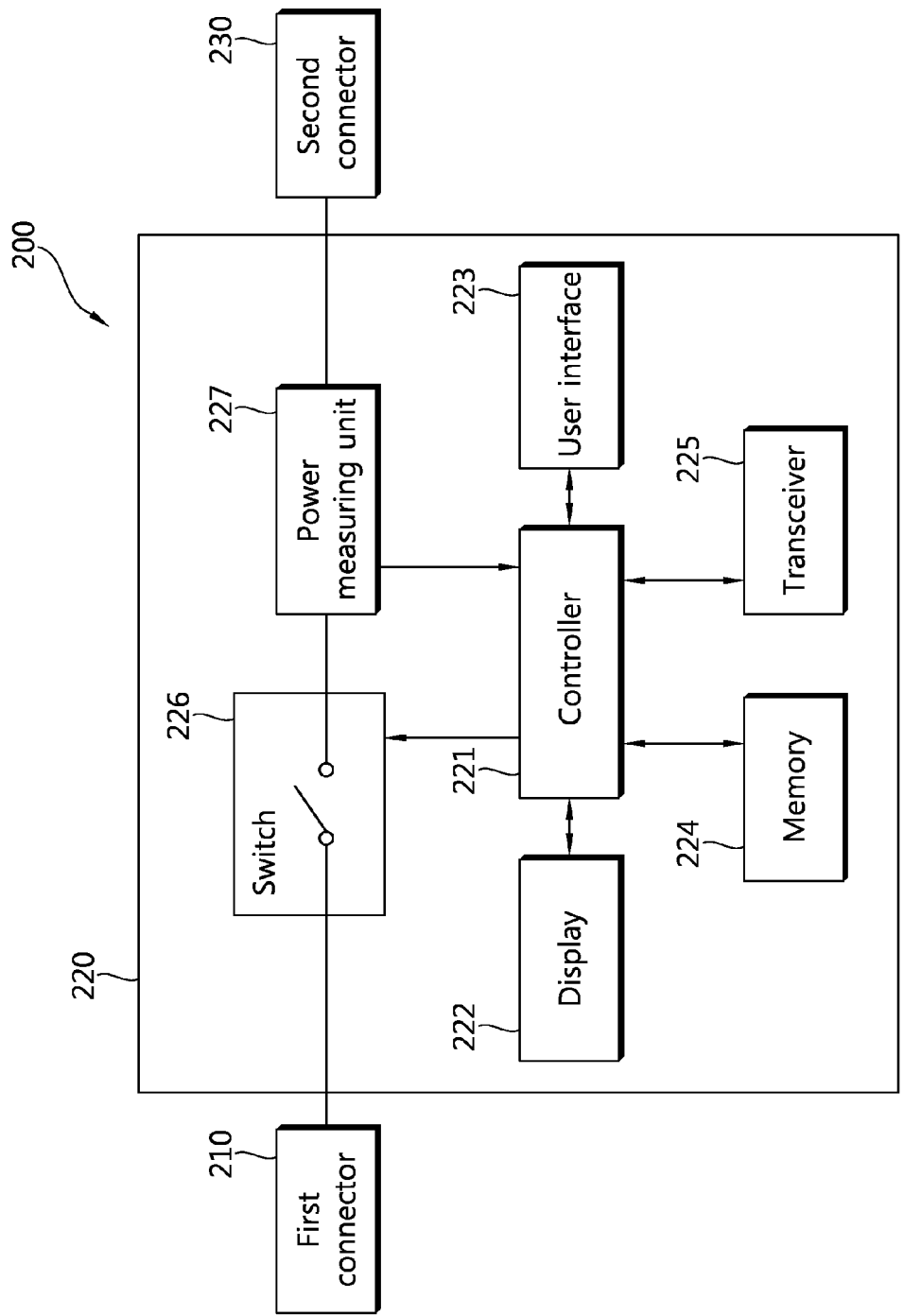
FIG. 2 is a block diagram illustrating the charging device shown in FIG. 1.

FIG. 2 is a block diagram illustrating the charging device shown in FIG. 1.

The charging device 200 includes a first connector 210, a control device 220, and a second connector 230.

The first connector 210 is electrically connected to the connector 110 of the vehicle 100. The second connector 230 is electrically connected to the connector 310 of the charging station 300.

The control device 220 controls operation of the charging device 200. More specifically, the control device 220 includes a controller 221, a display 222, a user interface 223, a memory 224, a transceiver 225, a switch 226, and a power measuring unit 227.

The display 222 displays authorization information, charging information, or billing information to a user. The display 222 includes a well-known display, such as an LCD (Liquid Crystal Display), or an OLED (Organic Light Emitting Diode) display. For example, the display 222 may display a remaining charging time or charging state while charging. Further, the display 222 may display billing information after completion of the charging.

The user interface 223 may include a combination of well-known user interfaces, such as a keypad or touch screen. The user interface 223 may be used for entry of a password for user authentication or for entry of user information, such as a charging identifier.

The memory 224 stores the charging identifier and/or authentication information. The authentication information is information for authenticating a user or vehicle to initiate charging of the battery. The charging identifier is an identifier used for identifying a user and/or vehicle 100 to perform charging. The charging identifier may include at least one of a user identifier and a vehicle identifier. The memory 224 may store payment information, such as a user's account or credit card information.

The transceiver 225 communicates with the electricity meter 400 or the server 500 through a network.

The switch 226, in response to a command from the controller 221, connects or disconnects the first connector 210 to/from the second connector 230. When the first connector 210 is connected to the second connector 230, the charging station 300 is connected to the vehicle 100, so that charging is initiated. When the connection between the first connector 210 and the second connector 230 is released, the charging is stopped.

As the charging initiates, the power measuring unit 227 measures electric power used for charging of the battery.

The controller 221 performs user authentication and controls the charging device 200. The controller 221 communicates various messages with the server 500 and the electricity meter 400 through the transceiver 225. The controller 221 may transmit a charging initiation request and a charging completion message to the server 500. The controller 221 may receive a charging initiation response and charging information from the server 500.

Upon initiation of charging, the controller 221 instructs the switch 226 to connect the first connector 210 with the second connector 230. When the charging is complete or stopped, the controller 221 instructs the switch 226 to disconnect the first connector 210 from the second connector 230.

Figure 3:
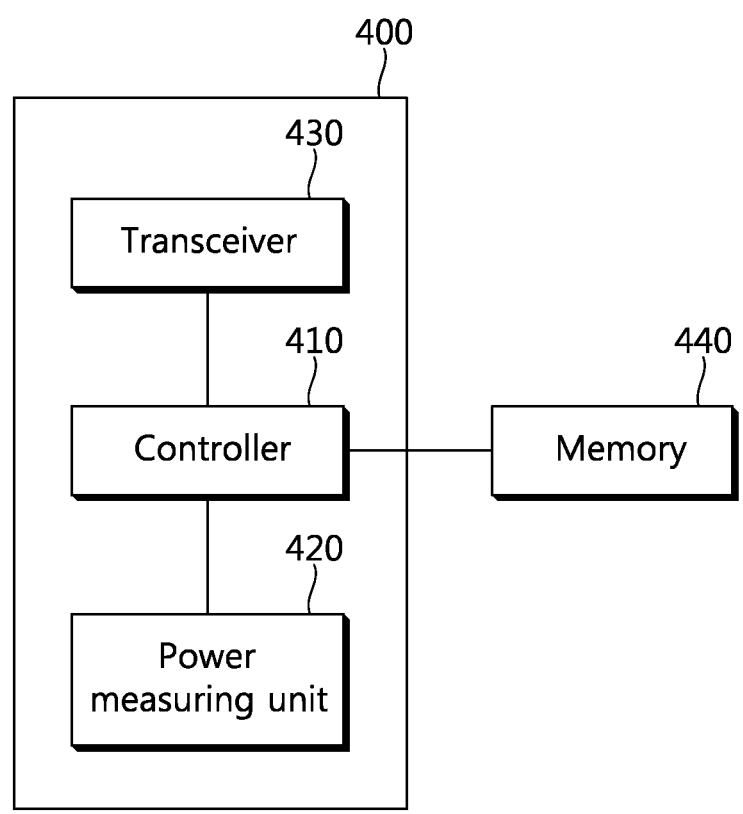
FIG. 3 is a block diagram illustrating the electricity meter shown in FIG. 1.

FIG. 3 is a block diagram illustrating the electricity meter shown in FIG. 1.

The electricity meter 400 includes a controller 410, a power measuring unit 420, a transceiver 430, and a memory 440.

The power measuring unit 420 measures electric power consumed by the charging station 300. The power measuring unit 420 is a facility basically installed in the charging station 300 irrespective of whether the charging device 200 consumes electric power and measures electric power consumed by facilities used in the charging station 300. Billing on electric power consumed by the charging station 300 is based on electric energy measured by the electricity meter 400. The electricity meter 400 may measure not only the power consumption but also other various information, such as the amount of gas or tab water consumed by the charging station 300.

The transceiver 430 communicates with the charging device 200 and the server 500 through a power line communication network, a wireless LAN, or a mobile communication network.

The memory 440 stores an identifier of the electricity meter 400 and/or an identifier of the charging station 300. Hereinafter, an identifier for identifying the electricity meter 400 and/or the charging station 300 is referred to as a meter identifier. The meter identifier includes at least one of an identifier of the electricity meter 400 and an identifier of the charging station 300.

The controller 410 controls operation of the electricity meter 400, and communicates various messages with the charging device 200 and the server 500 through the transceiver 430.

Figure 4:
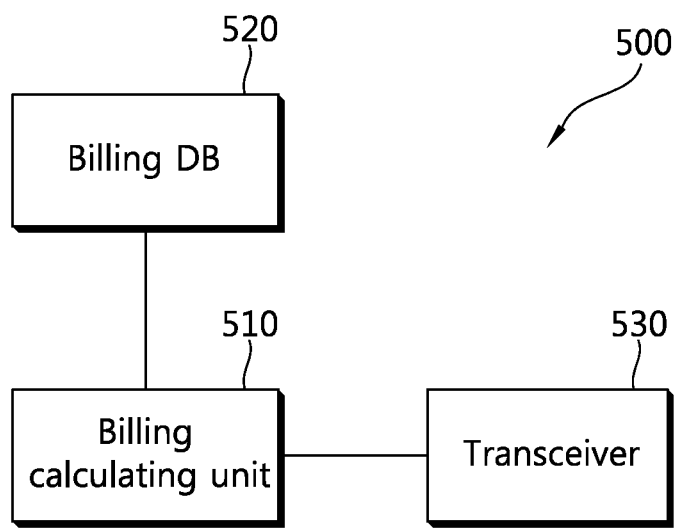
FIG. 4 is a block diagram illustrating the server shown in FIG. 1.

FIG. 4 is a block diagram illustrating the server shown in FIG. 1.

The server 500 includes a billing calculating unit 510, a billing data base (DB) 520, and a transceiver 530.

The billing DB 520 stores information for billing consumed power.

The transceiver 530 communicates with the charging device 200 and the electricity meter 400.

The billing calculating unit 510 controls the operation of the server 500 and communicates various messages with the charging device 200 and the electricity meter 400 through the transceiver 530.

Figure 5:
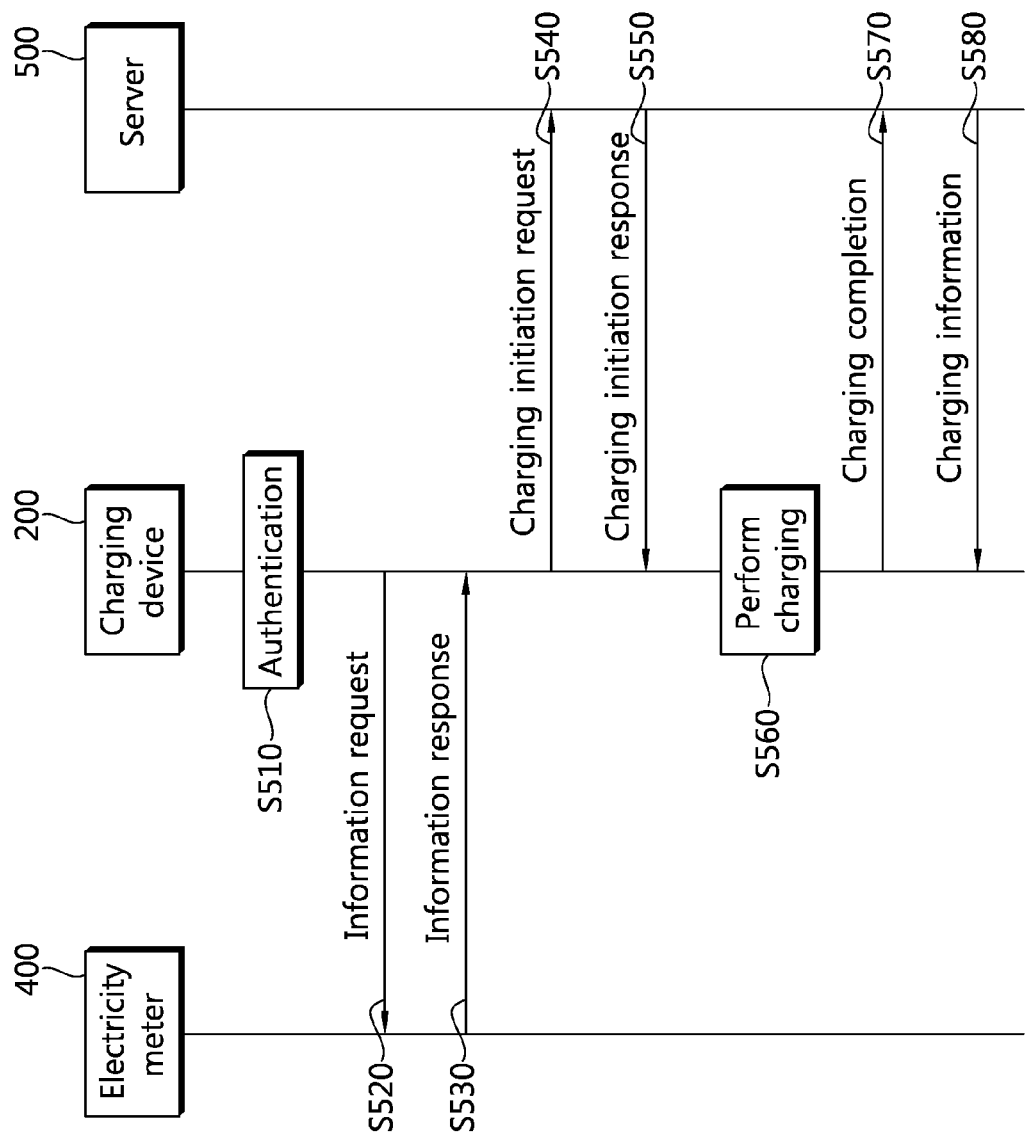
FIG. 5 is a flowchart illustrating a charging method according to an embodiment of the present invention.

FIG. 5 is a flowchart illustrating a charging method according to an embodiment of the present invention.

In step S510, the charging device 200 performs authentication on a user. The user authentication is performed by entry of a password or by other various methods.

When the user authentication is complete, the charging device 200 sends a charging initiation request to the electricity meter 400 in step S520. The charging initiation request includes a charging identifier.

In step S530, the charging device 200 receives an information response from the electricity meter 400 in response to the charging initiation request. The information response includes the charging identifier and a meter identifier. The charging device 200 may identify what electricity meter performs charging through the meter identifier.

In step S540, the charging device 200 sends the charging initiation request including the charging identifier and the meter identifier to the server 500.

In step S550, the server 500 sends the charging initiation response to the charging device 200 in response to the charging initiation request. The charging initiation response may include the charging identifier.

After receiving the charging initiation response, the charging device 200, in step S560, connects the charging station to the battery and performs charging. While charging, the charging device 200 measures electric power for charging. Likewise, the electricity meter 400 also keeps measuring electric power consumed.

As the charging is complete, the charging device 200 forwards a charging completion message to the server 500 in step S570. The charging completion message includes electric power for charging, the charging identifier, and/or the meter identifier.

In step S580, the server 500 calculates billing information for the battery charging and transfers the calculated billing information to the electricity meter 400. The server 500 determines a user based on the charging identifier and identifiers the electricity meter 400 based on the meter identifier. The charging device 200 displays the billing information and may inform the billing information to the user.

The server 500 may bill for the power consumed in the charging station 300 except for the power consumed by the user among the power consumed in the charging station 300. And, the server 500 bills the user for the power consumed for charging.

If the user connects the charging device 200 to the charging station 300 and succeeds authentication, then the power for charging may be billed by communication among the charging device 200, the electricity meter 400, and the server 500.

Accordingly, no separate authentication device or billing device is required at the charging station 300, and various points, such as houses or gas stations, for user to be able to easily access may be utilized as charging stations by using the charging device 200.

The controller may be implemented by a processor. The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for charging a battery, comprising:
performing, by a charging device, authentication for a user;
when the authentication is successfully completed, obtaining, by the charging device, a meter identifier for identifying what electricity charger performs charging, the electricity meter measuring power consumed in a charging station provided with power;

transmitting, by the charging device, a charging initiation request including the meter identifier and a charging identifier for identifying the user to a server;

receiving, by the charging device, a charging initiation response in response to the charging initiation request from the server;

after receiving the charging initiation response, connecting, by the charging device, the charging station with the battery to perform charging;

upon completion of the charging, transmitting, by the charging device, a charging completion message indicating power consumed for the charging to the server, the charging completion message including the charging identifier and the meter identifier; and receiving, by the charging device, charging information indicating billing information according to the charging of the battery from the server.

2. The method of claim 1, wherein obtaining the meter identifier comprises:

transmitting an information request requesting the meter identifier to the electricity meter; and receiving an information response including the meter identifier in response to the information request from the electricity meter.

3. A server comprising:

a billing DB for storing billing information for consumed power;

a transceiver for communicating with an electricity meter that measures power consumed in a charging station provided with power and a charging device for performing authentication for a user and charging a battery; and a billing calculating unit connected to the transceiver and the billing DB, wherein the billing calculating unit is configured to:

when the authentication is successfully complete, receive a charging initiation request, including a meter identifier for identifying what electricity meter performs charging and a charging identifier for identifying the user from the charging device, transmit a charging initiation response to the charging device in response to the charging initiation request, upon completion of the battery charging, receive a charging completion message indicating power consumed for the charging from the charging device, and transmit charging information indicating billing information according to the battery charging to the charging device.

4. The server of claim 3, wherein the transceiver communicates with the charging device through a mobile communication network and communicates with the electricity meter through power line communication.

5. The server of claim 3, wherein the billing calculating unit is configured to exclude billing for the battery charging from the billing by the charging station.

* * * * *